US006528194B1

(12) United States Patent
Condit et al.

(10) Patent No.: US 6,528,194 B1
(45) Date of Patent: Mar. 4, 2003

(54) FREEZE TOLERANT FUEL CELL POWER PLANT

(75) Inventors: David A. Condit, Avon, CT (US); Michael L. Perry, South Glastonbury, CT (US); Richard D. Breault, North Kingstown, RI (US)

(73) Assignee: UTC Fuel Cells, LLC, South Windsor, CT (US)

(*) Notice: Subject to any disclaimer, the term of this patent is extended or adjusted under 35 U.S.C. 154(b) by 17 days.

(21) Appl. No.: 09/935,254

(22) Filed: Aug. 22, 2001

(51) Int. Cl.[7] .................................... H01M 8/04
(52) U.S. Cl. .............................. 429/26; 429/24; 429/34
(58) Field of Search ............................ 429/26, 24, 34

(56) References Cited

U.S. PATENT DOCUMENTS

| | | | | |
|---|---|---|---|---|
| 3,982,961 A | * | 9/1976 | Grasso | 429/34 |
| 6,048,383 A | | 4/2000 | Breault et al. | |
| 6,171,718 B1 | | 1/2001 | Murach et al. | |
| 6,232,006 B1 | | 5/2001 | Breault | |
| 6,316,135 B1 | * | 11/2001 | Breault et al. | 429/26 X |
| 6,440,595 B1 | * | 8/2002 | Herdeg et al. | 429/26 |

OTHER PUBLICATIONS

The Author is "3M Speciality Fluids"; The title is "Practical Two Phase Cooling of Fuel Cells with 3M "Novec" Engineered Fluids"; Published on the world wide web, at www.3m.com/market/industrial/fluids/refheat/fuelcell.html. (No Date).

* cited by examiner

*Primary Examiner*—John S. Maples
(74) *Attorney, Agent, or Firm*—Malcolm J. Chisholm, Jr.

(57) ABSTRACT

The invention is a freeze tolerant fuel cell power plant that includes at least one fuel cell; a coolant loop having a coolant circulating device that directs a water coolant through a water transport plate within the fuel cell; and a water displacement system having a freeze tolerant accumulator that contains a water immiscible fluid and water coolant. The water displacement system also includes a water immiscible fluid pump, heater and displacement valves for directing the water immiscible fluid to flow from the accumulator into the coolant loop; for directing the water coolant in the coolant loop to flow into the accumulator; and, for directing heated water immiscible fluid to flow from the accumulator into the coolant loop and back into the accumulator.

18 Claims, 2 Drawing Sheets

FREEZE TOLERANT FUEL CELL POWER PLANT

TECHNICAL FIELD

The present invention relates to fuel cell power plants that are suited for usage in transportation vehicles, portable power plants, or as stationary power plants, and the invention especially relates to a fuel cell power plant that utilizes a water immiscible fluid having a low freezing temperature to displace a water coolant within fuel cells and a coolant loop of the plant.

BACKGROUND OF THE INVENTION

Fuel cell power plants are well-known and are commonly used to produce electrical energy from reducing and oxidizing fluids to power electrical apparatus such as apparatus on-board space vehicles. In such power plants, a plurality of planar fuel cells are typically arranged in a stack surrounded by an electrically insulating frame structure that defines manifolds for directing flow of reducing, oxidant, coolant and product fluids. Each individual cell generally includes an anode electrode and a cathode electrode separated by an electrolyte. A reactant or reducing fluid such as hydrogen is supplied to the anode electrode, and an oxidant such as oxygen or air is supplied to the cathode electrode. In a cell utilizing a proton exchange membrane ("PEM") as the electrolyte, the hydrogen electrochemically reacts at a surface of the anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

While having important advantages, PEM cells are also known to have significant limitations especially related to liquid water transport to, through and away from the PEM. Use of such fuel cells to power a transportation vehicle gives rise to additional problems associated with water management, such as preventing mechanical damage when the product water and/or any water coolant fluid freezes, and rapidly melting any frozen water during start up whenever the fuel-cell powered vehicle is shut down in sub-freezing conditions.

Accordingly there is a need for a fuel cell that may be shut down in sub-freezing conditions that does not sustain mechanical damage resulting from freezing and that does not require isolating an antifreeze cooling fluid from the cathode and anode electrodes within a sealed coolant system so that fuel cell generated product water may be removed within porous water transport plates.

DISCLOSURE OF THE INVENTION

The invention is a freeze tolerant fuel cell power plant that includes at least one fuel cell for generating electrical current from reducing fluid and process oxidant reactant streams; a coolant loop having a coolant pump that directs a water coolant through a coolant passage, a water transport plate within the fuel cell, a coolant heat exchanger, and back to the fuel cell; and a water displacement system having an open tube accumulator that contains a water immiscible fluid and water coolant, and having a water immiscible fluid pump that pumps the water immiscible fluid from a discharge of the accumulator through a water immiscible feed line to displace the water coolant within the coolant loop.

Also included in the water displacement system is a heater secured to the water immiscible feed line to heat the water immiscible fluid passing through the feed line, and a coolant loop drain line secured between the coolant loop and an accumulator inlet for draining the water coolant and/or the water immiscible fluid from the coolant loop into the accumulator. The system also includes displacement valves for selectively directing the water immiscible fluid to flow from the accumulator into the coolant loop, for selectively directing the water coolant to flow into the accumulator, and for selectively directing heated water immiscible fluid from the feed line back into the accumulator to heat water coolant in the accumulator. The water displacement system may also include a water immiscible fluid re-cycle line secured downstream of the heater between the feed line and the inlet of the accumulator to direct heated water immiscible fluid to the inlet of the accumulator.

The open tube accumulator includes a plurality of open plastic tubes that are configured as a heat exchanger. Liquid phase water coolant surrounds exterior surfaces of the open plastic tubes, and upon freezing of the water coolant within the accumulator during a long term power plant shut down, the plastic tubes deform to absorb a volume increase of the freezing water to avoid mechanical damage to the accumulator. Upon start-up after the long term shut down, the water immiscible fluid re-cycle line directs heated water immiscible fluid from the discharge of the accumulator and the heater into the inlet of the accumulator so that the heated water immiscible fluid flows through the open tubes to thaw the water coolant.

In a preferred embodiment, the water immiscible fluid is selected from the group consisting of perfluorocarbons, hydrofluoroethers, alkanes, alkenes and alkynes. Exemplary water immiscible fluids include straight chain alkanes such as octane, nonane and decane and mixtures thereof. The water immiscible fluid may have a density that is greater than or less than the density of water. A preferred density differential of the water immiscible fluid compared to water is plus or minus 0.2 grams per cubic centimeter.

In use of the freeze tolerant fuel cell power plant during normal operation, the water immiscible fluid remains within the open tube accumulator separated from any water coolant within the accumulator, and water coolant cycles through the fuel cell and coolant heat exchanger to maintain the fuel cell within an optimal temperature range. When the fuel cell power plant is shut down for a short term shut down, the displacement valves operate to control flow of the water coolant into the accumulator, and the water immiscible pump directs the water immiscible fluid into the coolant loop to displace the water coolant. The heater may be used in conjunction with the water immiscible pump to provide heated water immiscible fluid through the fuel cell to maintain the fuel cell temperature above a minimum level. When a desired temperature is achieved, the water immiscible fluid is directed back into the accumulator. To return the fuel cell power plant to operation after such a short term shut down, the coolant pump is utilized to direct water coolant from the accumulator back into the coolant loop.

For a long term shut down, the same procedure is undertaken by the displacement valves to direct the water coolant into the accumulator; to direct the water immiscible fluid into the coolant loop to displace the water coolant; and, to then drain the water immiscible fluid back into the accumulator. Periodic heating by the water immiscible fluid is not undertaken, and water coolant in the accumulator and/or within pores of fuel cell components is permitted to freeze. To start up the power plant after a long term shut down, the displacement valves first direct the water immiscible fluid to pass from the accumulator discharge through the heater and the re-cycle line to pass into the accumulator inlet and to flow through the open tubes of the accumulator to melt frozen water coolant. Next, the displacement valves direct the heated water immiscible fluid to pass through the coolant loop to melt any ice within the water transport plate and any other fuel cell components. Then the water immiscible fluid is directed back into the accumulator while the water coolant is directed into the coolant loop so that the fuel cell may commence generating electrical current.

The coolant loop may also include a gas separator to direct any reactant gas out of the coolant loop, and the gas separator may include an overflow line to direct excess product water into the accumulator whenever the power plant is producing more water than it is utilizing, which is characterized as being in positive water balance. In the event the power plant is operating in negative water balance, water may be directed from the accumulator to supplement water coolant in the coolant loop.

Accordingly, it is a general purpose of the present invention to provide a freeze tolerant fuel cell power plant that overcomes deficiencies of the prior art.

It is a more specific object to provide a freeze tolerant fuel cell power plant that permits utilization of a porous water transport plate that facilitates removal of product water from fuel cells of the plant.

It is yet another object to provide a freeze tolerant fuel cell power plant that provides for rapid start up of the power plant after a short term shut down.

It is another object to provide a freeze tolerant power plant that prevents mechanical damage of the plant by freezing of a water coolant during long term shut down of the power plant.

These and other objects and advantages of the present freeze tolerant fuel cell power plant will become more readily apparent when the following description is read in conjunction with the accompanying drawings.

DESCRIPTION OF THE PREFERRED EMBODIMENTS

Figure 1:
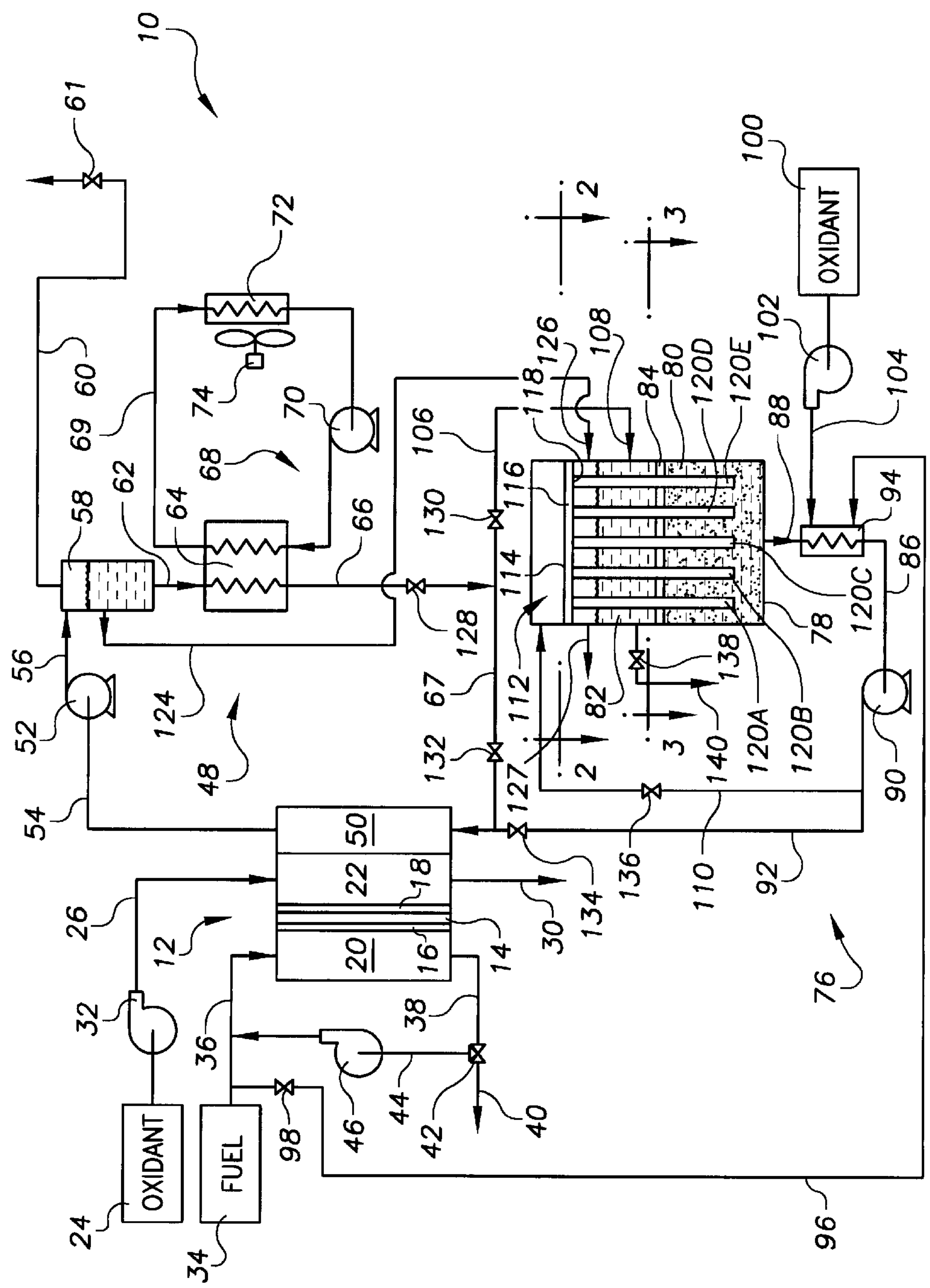
FIG. 1 is a schematic representation of a freeze tolerant fuel cell power plant constructed in accordance with the present invention.

Referring to the drawings in detail, a freeze tolerant fuel cell power plant of the present invention is shown in FIG. 1, and is generally designated by the reference numeral 10. The power plant 10 includes an electrical current producing fuel cell means for producing electrical current from reducing fluid and process oxidant reactant streams, such as a fuel cell 12. The fuel cell 12 includes an electrolyte 14, such as a proton exchange membrane, an anode catalyst 16 and a cathode catalyst 18 secured to opposed sides of the electrolyte 14, an anode flow field 20 defined adjacent to the anode catalyst 16, and a cathode flow field 22 defined adjacent the cathode catalyst 18. As is well-known in the art, the fuel cell 12 may be combined with other virtually identical fuel cells (not shown) to form a cell stack assembly including manifolds to direct the reactant streams through the stack. An oxidant supply 24 (labeled "oxidant" in FIG. 1 for convenience) directs an oxidant, such as air, through an oxidant inlet 26 into the cathode flow field 22 so that the cathode flow field 22 directs the oxidant to flow past the cathode catalyst 18. A cathode exhaust 30 directs the oxidant as a cathode exhaust stream out of the fuel cell 12 where the cathode exhaust stream may be treated for transfer of mass and heat, as is well known in the art, as shown for example in U.S. Pat. No. 6,048,383 that issued on Apr. 11, 2000 to the assignee of all rights in the present invention, which Patent is hereby incorporated herein by reference. An oxidant blower 32 may be positioned on the oxidant inlet 26 to provide the oxidant into the cathode flow field 22. A reducing fluid fuel source 34 (labeled "FUEL" in FIG. 1 for convenience) directs a reducing fluid such as hydrogen gas through a reducing fluid inlet 36 into the anode flow field 20, wherein the anode flow field directs the reducing fluid to pass adjacent the anode catalyst 16 and to generate an electrical current in a manner well known in the art. The reducing fluid then passes out of the anode flow field 20 as an anode exhaust stream into an anode exhaust passage 38 that directs the anode exhaust stream to pass out of the fuel cell 12 through an anode exhaust 40. An anode exhaust re-cycle valve 42 may direct a portion or all of the anode exhaust to pass from the anode exhaust passage 38 into an anode exhaust re-cycle line 44, through an anode recycle blower 46 and back into the reducing fluid inlet 36 to use any unused reducing fluid and/or to re-cycle any water vapor within the anode exhaust stream.

The freeze tolerant fuel cell power plant 10 also includes a primary coolant loop 48 having a water transport plate 50 secured adjacent the cathode flow field 22 in the fuel cell 12. (The "primary coolant loop 48" may be occasionally referred to herein as the "coolant loop 48".) The water transport plate 50 may be a porous plate well known in the art that facilitates movement of product water generated at the cathode catalyst 18 through the porous plate 50 and out of the fuel cell 12. The coolant loop 48 also includes a coolant pump 52 secured between a coolant exhaust passage 54 and a coolant feed passage 56 that pumps a water coolant through the coolant feed passage 56, through a gas separator 58 wherein any reactant gases are passed out of the plant through a gas line 60 and gas exhaust vent valve 61, and through a first extension 62 of the coolant feed passage 56 into a coolant heat exchanger 64. The water coolant then passes through a second extension 66 of the coolant feed passage 56 and then a third extension 67 of the feed passage 56 and then back into the water transport plate 50. The coolant pump 52 may be any standard fluid pumping or circulating apparatus known in the art for circulating a fluid for cooling purposes through the coolant loop 48. Therefore, the coolant pump or any other such circulating apparatus may be referred to herein as a coolant circulating means for circulating the water coolant through the coolant loop 48.

The coolant heat exchanger 64 may be any standard heat exchanger means well known in the art for removing heat from the water coolant, such as a liquid-liquid coolant heat exchanger 64 which is also a component of a secondary coolant loop 68. The secondary coolant loop 68 directs a secondary coolant, such as a traditional antifreeze solution, for example ethylene glycol and water or propylene glycol and water, to circulate through a secondary coolant passage 69 secondary coolant pump 70, a secondary coolant radiator

72 adjacent a fan 74 to pass ambient air over the radiator 72 to cool the secondary coolant, much like a traditional automobile radiator, and through the coolant heat exchanger 64 to draw heat out of the water coolant. As is well known, traditional antifreeze solutions would poison the anode and cathode catalysts 16, 18, and by utilizing such traditional antifreezes within a secondary sealed coolant loop 68, the catalysts are protected from exposure to those traditional antifreezes. The water coolant circulating through the primary coolant loop 48 including the porous water transport plate 50 is primarily water which cannot poison the anode or cathode catalysts 16, 18. The coolant loop 48 also includes standard manifolds [not shown] well known in the art for passing the water coolant through the fuel cell 12, and any cell stack assembly including the fuel cell 12.

The freeze tolerant fuel cell power plant 10 also includes a water displacement system 76 means for displacing the water coolant in the coolant loop 48 with a water immiscible fluid. The water displacement system 76 may include an open tube accumulator 78 that contains both the water immiscible fluid 80 and water coolant 82 separated by a baffle 84. A water immiscible fluid feed line 86 is secured to a water immiscible fluid discharge 88 of the accumulator 78 and is in fluid communication with a water immiscible fluid pump 90 that pumps the water immiscible fluid from the accumulator 78, through the discharge 88, feed line 86 and an extension 92 of the feed line 86 into the primary coolant loop 48, such as at the third extension 67 of the coolant feed passage 56 as shown in FIG. 1. The water immiscible fluid pump 90 may be any pump or circulating apparatus known in the art that is capable of circulating the water immiscible fluid from the accumulator through the water immiscible fluid feed line 86. The water immiscible fluid pump 90 or circulating apparatus may therefore be referred to herein as a water immiscible circulating means for circulating the water immiscible fluid. The discharge 88 of the accumulator 78 is secured to the accumulator 78 adjacent the water immiscible fluid 80 within the accumulator 78, as shown in FIG. 1. A heater 94 is secured in heat exchange relationship with the water immiscible fluid 80 within the water displacement system 76, such being secured to the water immiscible feed line 86 as shown in FIG. 1. The heater may be any conventional heater means for heating a fluid, including an electrical heater within the accumulator 76, or such as the heater 94 that receives fuel from the reducing fluid fuel storage 34 through a heater fuel supply line 96 and heater fuel supply valve 98, and that receives an oxidant such as air, for example from a second oxidant storage source 100, and a second oxidant blower 102 along a heater oxidant supply line 104. The water displacement system 76 also includes a coolant loop drain line 106 secured between the primary coolant loop 48 and a water coolant drain inlet 108 of the open tube accumulator 78, wherein the water coolant drain inlet 108 is secured to the accumulator 78 adjacent the water coolant 82 within the accumulator 78, as shown in FIG. 1.

The water displacement system 76 may also include a water immiscible fluid re-cycle line 110 that is secured between the water immiscible feed line 86 downstream of the heater 94 and a water immiscible fluid inlet 112 of the open tube accumulator 78 in order to direct heated water immiscible fluid through the water immiscible fluid inlet 112 onto a water immiscible fluid side 114 of a header 116 that is opposed to a water coolant side 118 of the header 116. As shown in FIG. 1, the water coolant side 118 of the header 116 faces and is adjacent to the water coolant 82 within the accumulator 78, and the opposed water immiscible side 114 of the header faces the water immiscible fluid inlet 112.

Figure 3:
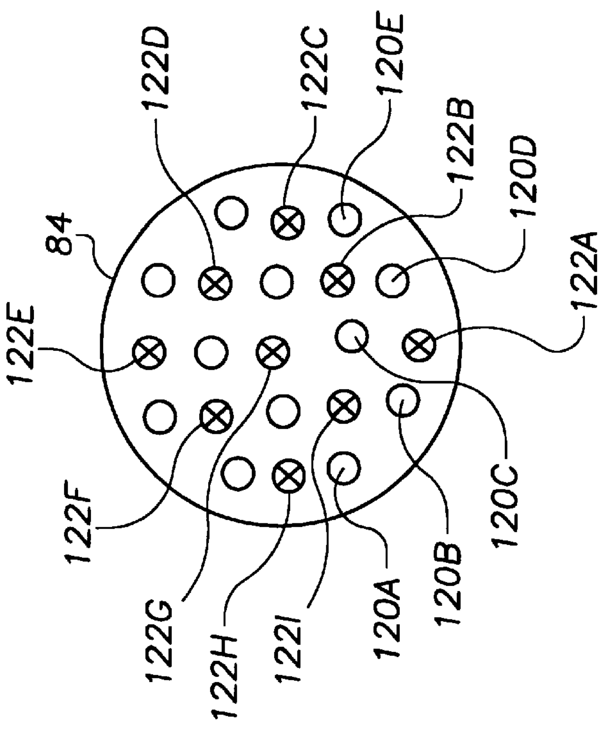
FIG. 3 is a schematic, cross-section, fragmentary view of a baffle of an open tube accumulator of the FIG. 1 freeze tolerant fuel cell power plant taken along view line 3—3 of FIG. 1.
Figure 2:
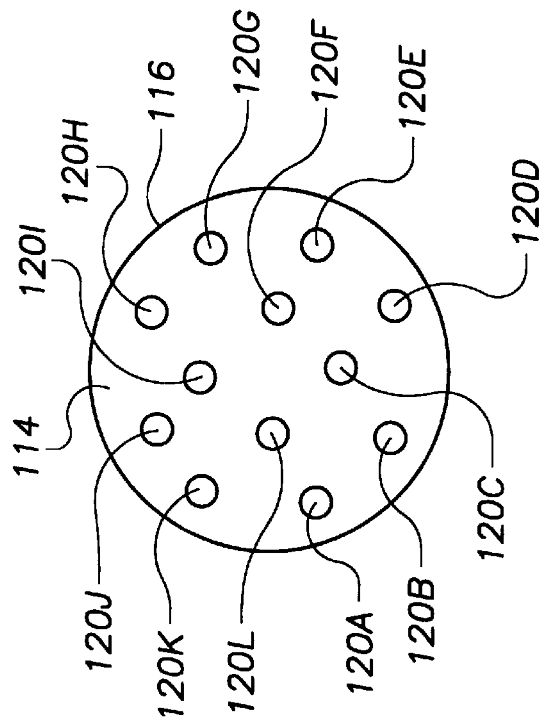
FIG. 2 is a schematic, cross-section, fragmentary view of a header of an open tube accumulator of the FIG. 1 freeze tolerant fuel cell power plant taken along view line 2—2 of FIG. 1.

As best seen in FIG. 1, the open tube accumulator 76 includes a plurality of open tubes 120A, 120B, 120C, 120D, 120E secured to the header 116 that extend away from the water immiscible fluid inlet 112 into a storage area of the accumulator 78 that stores the water coolant 82 and water immiscible fluid 80. As seen in FIG. 2, additional open tubes 120F, 120G, 120H, 120I, 120J, 120K, 120L are secured to the header 116. The open tubes 120A–120L pass through the baffle 84 that is secured between the water coolant 82 and the water immiscible fluid 80. As shown in FIG. 3, the baffle 84 also includes a plurality of drain holes 122A, 122B, 122C, 122D, 122E, 122F, 122G, 122H, 122I (which are shown in FIG. 3 having crossed lines through each drain hole for ease of distinguishing them from the open tubes 120A–120L). The drain holes 122A–122I serve to permit movement of the water coolant 82 and water immiscible fluid 80 through the baffle 84.

If the water immiscible fluid re-cycle line 110 directs some of the water immiscible fluid to flow into the water immiscible fluid inlet 112 adjacent the header 116, the water immiscible fluid will flow through the open tubes 120A–120L to pass through the water coolant 82 stored in the accumulator 78 without mixing with the stored water coolant 82 above the baffle 84. Therefore, if the water immiscible fluid is heated by the heater 94 or otherwise heated, the water immiscible fluid passing through the open tubes 120A–120L will heat and thaw any frozen water coolant within the accumulator 78. The open tubes 120A–120L are constructed of an elastically deformable material, such as plastic, so that whenever the water coolant 82 freezes, the open plastic tubes deform to absorb an increase in volume of the frozen water coolant 82 to thereby eliminate mechanical damage to the accumulator 78 during a long term shut down of the fuel cell power plant 10 in sub-freezing condition. Because the water immiscible fluid 80 within the accumulator 78 is more dense than the water coolant 82, it moves toward the water immiscible fluid discharge 88, and the water coolant moves toward the water coolant drain inlet 108, away from the water immiscible fluid 80. The open drain holes 122A–122I within the baffle 84 serve to permit movement of the water immiscible fluid 80 and water coolant 82 within the open tube accumulator 78. The water displacement system 76 may be dimensioned, however, so that when the fuel cell 12 is under normal operation and the water immiscible fluid 80 remains within the accumulator 78, the water immiscible fluid extends from the water immiscible fluid discharge 88 to the baffle 84.

A water coolant overflow line 124 may also extend between the gas separator 58 and an overflow inlet 126 of the open tube accumulator 78 that is secured to the accumulator 78 between the water coolant side 118 of the header 116 and the baffle 84 so that excess water, such as product water generated by the fuel cell 12 that moves through the porous water transport plate 50 into the coolant loop 48 may overflow from the separator 58, through the coolant overflow line 124 and the overflow inlet 126 into the water coolant 82 within the accumulator 78. By positioning the overflow inlet 126 between the water coolant side 118 of the header 116 and the baffle 84, the excess water coolant does not flow into the open tubes 120A–120L, and is therefore restricted from mixing with the water immiscible fluid 80 within the accumulator 78. The accumulator 78 also includes an exhaust vent 127 secured adjacent the water coolant side 118 of the header for permitting overflow of water coolant and/or air to pass out of the accumulator 78 and for permitting inflow of air into the accumulator 78.

The accumulator 78 described above and shown in FIG. 1 describes the water immiscible fluid as denser than the water coolant. However, the water immiscible fluid may also have a density that is less than water. To utilize a water immiscible fluid that is less dense than water, appropriate changes would be made to the accumulator 78 and to positioning of the water immiscible fluid discharge 88, water coolant drain inlet 108, etc. The water immiscible fluid may have a density that is greater than or less than the density of water, and a preferred density differential of the water immiscible fluid compared to water is plus or minus 0.2 grams per cubic centimeter.

It is to be understood that the scope of this freeze tolerant fuel cell power plant 10 includes in a preferred embodiment the described open tube accumulator 78, and that alternative embodiments include any freeze tolerant water coolant and water immiscible fluid accumulators known in the art that are capable of storing the water coolant and water immiscible fluid in a freeze tolerant manner. The scope of the invention includes in particular displacing the water coolant from the coolant loop with the water immiscible fluid during periods of power plant shut down so that the water coolant and water immiscible fluid are stored in what will be described herein as a freeze tolerant accumulator means for storing the water coolant and water immiscible fluid. A preferred embodiment includes the open tube accumulator 78. It is also noted that the scope of the invention includes embodiments with the described heater 94, and also includes embodiments without the heater 94. While the heater 94 is useful for specific embodiments as described herein, it within the scope of the invention that particular embodiments of the freeze tolerant fuel cell power plant 10 only need the water displacement system 76 for freeze protection through displacement of the water coolant to a freeze tolerant accumulator means and will not need the heater 94 for start up of the power plant 10.

The water displacement system 76 also includes fluid displacement control valve means for selectively directing the water immiscible fluid to flow from the open tube accumulator 78 into the primary coolant loop 48; for selectively directing the water coolant within the coolant loop 48 to flow into the accumulator 78; and, for selectively directing heated water immiscible fluid to flow from adjacent the water immiscible fluid discharge 88 into the water immiscible fluid inlet 112 of the accumulator 78 to heat water coolant within the accumulator 78. The fluid displacement control valve means may include a coolant circulation valve 128 secured between the coolant pump 52 and the water transport plate 50, for example secured on the second extension 66 of the coolant feed passage 56; a water coolant feed valve 130 secured between water coolant 82 within the accumulator 78 and the water transport plate 50, for example secured on the coolant loop drain line 106; a coolant drain valve 132 secured between the water coolant inlet 108 of the accumulator 78 and the water transport plate 50, for example secured on the third extension 67 of the coolant feed passage 56; a water immiscible fluid feed valve 134 secured between the water immiscible fluid discharge 88 of the accumulator and the water transport plate 50, for example secured on the first extension 92 of the water immiscible fluid feed line 86; and, a water immiscible fluid re-cycle valve 136 secured between the heater means 94 and the water immiscible fluid inlet 112 of the accumulator 78, for example secured on the water immiscible fluid re-cycle line 110, all as shown in FIG. 1.

A blow-down drain valve 138 may also be secured to a drain 140 of the accumulator 78 that is secured to the accumulator 78 adjacent the baffle 84 and between the baffle 84 and the header 116 to selectively permit draining of water coolant 82 from the accumulator 78, for example whenever the fuel cell 12 is generating more water than the power plant 10 needs, which as indicated above is characterized as the fuel cell power plant 10 operating in positive water balance.

During normal operation of the freeze tolerant fuel cell power plant 10, the coolant circulation valve 128 is open; the water coolant feed valve 130 is closed; the coolant drain valve 132 is open; and, the water immiscible fluid feed valve 134 is closed so that the water immiscible fluid 80 remains within the open tube accumulator 78 as the water coolant circulates through the primary coolant loop 48. It is noted that coolant circulation valve 128 or the coolant drain valve 132 may also be controlled during plant operation to restrict passage of the water coolant through the coolant feed passage 56 or the first, second or third extensions 62, 66, 67 of the coolant feed passage 56 to maintain the water coolant within the water transport plate 50 at a lower pressure than the process oxidant stream passing through the cathode flow field 22. If the plant 10 operates in sustained positive water balance, excess product water passing through the coolant overflow line 124 from the coolant loop 48 into the accumulator may overflow out of the plant 10 through the exhaust vent 127 or the blow down drain valve 138 and drain 140 of the accumulator 78.

When the freeze tolerant fuel cell power plant 10 is to be shut down for a short term storage, such as an overnight storage of a transportation vehicle that is powered by the plant 10 and operated in sub-freezing ambient temperatures, first the water coolant feed valve 130 is opened to permit draining of the water coolant within the coolant loop 48 into the accumulator 78. Next, the coolant pump 52 is shut down, the water coolant feed valve 130 is closed and the coolant drain valve 132 is closed, and the water immiscible fluid valve 134 is open while the water immiscible fluid pump 90 starts pumping the water immiscible fluid 80 from the accumulator discharge 88 through the water immiscible fluid feed line 86 and feed valve 134 into the coolant loop 48. The coolant pump 52 may be operated to assist movement of the water immiscible fluid throughout all components of the coolant loop 48 including all manifolds and related channels, etc. (not shown) of a cell stack assembly (not shown) in which the fuel cell 12 is positioned to make sure all water coolant is displaced by the water immiscible fluid from the coolant loop 48 through the coolant overflow line 124 into the accumulator 78. Next, the coolant pump 52 and water immiscible fluid pump 90 are stopped, and the water coolant feed valve 130 is opened to permit draining of the water immiscible fluid from the coolant loop 48 into the accumulator 78 through the water coolant drain inlet 108. Because the water immiscible fluid is a greater density than the water coolant 82 within the accumulator 78, the water immiscible fluid separates from the water coolant, and passes through the drain holes 122A–122I in the baffle 84 to mix with the water immiscible fluid 80 within the accumulator 78. The freeze tolerant fuel cell power plant 10 is thereby in storage condition wherein almost all water within the coolant loop has been displaced by the water displacement system 76 to the accumulator 78. Water will remain within the PEM electrolyte 14 and the pores of the water transport plate 50, and possibly within pores or channels of materials defining the anode and cathode flow fields 20, 22.

To maintain the freeze tolerant fuel cell power plant 10 in a short term storage condition, any small amounts of water remaining within the fuel cell 12 or coolant loop 48, and the water coolant within the accumulator 78 must be maintained above freezing so that the fuel cell power plant 10 may be started up without delay. A controller means for controlling the aforesaid valves 128, 130, 132, 134 and 136 of the displacement valve means, such as controllers well known in the art that actuate valves in response to sensed information, may be utilized to heat the fuel cell 12, coolant loop 48 and accumulator 78 whenever the controller means senses a temperature of the fuel cell 12, coolant loop 48 or accumulator 78 descending below a short term storage minimum temperature. The controller means could actuate the valves 128, 130, 132, 134, and 136 of the displacement valve means through well known mechanisms, including manual valve controls, electromechanical actuators, electro-hydraulic actuators, etc. To maintain the fuel cell power plant 10 in a short term storage condition, whenever the controller means senses a temperature of the fuel cell 12, coolant loop 48 or accumulator 78 descending below the short term storage minimum temperature, the controller means first closes the water coolant feed valve 130, then the heater 94 and water immiscible fluid pump are activated and the water immiscible fluid feed valve 134 is opened to direct heated water immiscible fluid into the coolant loop 48. The coolant pump 52 may also be turned on to assist in circulation of the heated water immiscible fluid throughout the coolant loop 48 to uniformly heat the fuel cell 12. The heated water immiscible fluid also fills and overflows the gas separator 58 and returns trough the coolant overflow line 124 to heat the accumulator 78. When a desired heating temperature is achieved, the heater 94, water immiscible fluid pump 90 and coolant pump 52 are shut down, and the water coolant feed valve 130 and gas exhaust vent valve 61 are opened to permit the water immiscible fluid to drain back into the accumulator 78. If the freeze tolerant fuel cell power plant 10 is to be permitted to go into long term storage, the water immiscible fluid feed valve 134 may be closed, and the water coolant 82 within the accumulator 78 is permitted to freeze and any water within the fuel cell 12, such as within pores of the water transport plate 50, is also permitted to freeze. As indicated above, because the open tubes 120A–120L are deformable and because so little water remains within the fuel cell 12 and coolant loop 48, no mechanical damage occurs to the plant 10 from such freezing.

To start up the power plant 10 after a short term storage wherein the water coolant 82 within the accumulator 78 is not frozen, the water coolant feed valve 130 and coolant drain valve 132 are opened, and the coolant circulation valve 128 is closed while the coolant pump 52 is activated to draw water coolant from the accumulator 78 into the coolant loop 48. Whenever water coolant passes from the gas separator 58 through the coolant overflow line 124 into the accumulator 78, the coolant circulation valve 128 is opened, and the water coolant feed valve 130 is closed. The power plant 10 is then ready for operation.

To start up the power plant 10 after a long term storage, wherein the water coolant 82 within the accumulator 78 is frozen, first the water immiscible fluid feed 134 valve is closed and the water immiscible fluid re-cycle valve 136 is open. Next, the heater 94 and the water immiscible fluid pump 90 are activated so that heated water immiscible fluid begins to circulate through the water immiscible fluid re-cycle line 110, water immiscible fluid inlet 112, and the open tubes 120A–120L of the accumulator 78 to thaw the frozen water coolant 82 within the accumulator 78. When the water coolant 82 within the accumulator 78 has melted, the water immiscible fluid re-cycle valve 136 is closed, and the water immiscible fluid feed valve 134 is opened and the coolant pump 52 is activated to pump heated water immiscible fluid through the coolant loop 48 to uniformly heat the fuel cell 12 and coolant loop 48. When a desired start-up temperature is achieved, the coolant pump 52, water immiscible fluid pump 90 and the heater 94 are de-activated, and water coolant feed valve 130 is opened to permit drainage of the water immiscible fluid from the coolant loop 48 back into the accumulator 78. The above described procedure for start up of the plant 10 from a short term storage may then be utilized to start up the freeze tolerant fuel cell power plant 10.

For purposes of efficiency in understanding, the present invention may also be described as permitting storage and operation of the freeze tolerant fuel cell power plant 10 in sub-freezing ambient conditions by utilizing the water displacement system 76 to place the power plant 10 in a short term storage condition through the steps of pumping water immiscible fluid from the accumulator 78 into the coolant loop 48 to displace the water coolant from the coolant loop 48 to the accumulator 78; draining the water immiscible fluid from the coolant loop back to the accumulator 78, and, whenever a sensed temperature of the fuel cell 12, coolant loop 48 or accumulator 78 descends to a short term storage minimum temperature, heating and pumping the water immiscible fluid from the accumulator 78 through the coolant loop 48 and open tubes 120A–120L of the accumulator 78, and draining the heated water immiscible fluid back to the accumulator 78. Similarly, the power plant 10 may be described as utilizing the water displacement system 76 to place the power plant 10 in a long term storage condition through the steps of pumping water immiscible fluid from the accumulator 78 into the coolant loop 48 to displace the water coolant from the coolant loop 48 to the accumulator 78; and, draining the water immiscible fluid from the coolant loop back to the accumulator 78, wherein the water coolant is positioned within the accumulator 78 adjacent deformable open tubes 120A–120L so that expansion of the water coolant upon freezing is absorbed by deforming of the open tubes 120A–120L.

The freeze tolerant power plant 10 may also be described as utilizing the water displacement system 76 to start up the power plant 10 after a short term storage by pumping water coolant from the accumulator 78 throughout the coolant loop 48 and preventing drainage of the water coolant from the coolant loop 48 back into the accumulator 78. Start up of the power plant 10 after a long term storage may be described as heating and recycling the water immiscible fluid through the open tubes 120A–120L within the accumulator 78 to thaw the frozen water coolant; then pumping the heated water immiscible fluid through the coolant loop 48 to melt any water within the coolant loop 48; then draining the water immiscible fluid from the coolant loop 48 back to the accumulator 78; pumping the water coolant from the accumulator 78 into the coolant loop 48; and preventing drainage of the water coolant back into the accumulator 78.

A first preferred water immiscible fluid is selected from the group consisting of perfluorocarbons, hydrofluoroethers, and mixtures thereof that have a freezing temperature that is at least as low as minus forty (−40) degrees Celsius ("° C.") and that are not misicible with water. Suitable perfluorocarbons are perfluoroalkanes, perfluorotrialkylamine and perfluorotributylamine, which are available from the 3M Specialty Minerals Company of St. Paul, Minn., U.S.A. and are sold under the designations of "Grades FC-77, FC-3283, and FC-40" respectively. A suitable hydrofluoroether is sold under the designation "Grade HFE-7500". The aforesaid perfluorocarbons are available from the 3M Specialty Minerals Company under the trademark "FLUORINERT PFC", and the suitable hydrofluoroethers are also available from the aforesaid 3M company under the trademark "NOVEC HFE".

A second preferred water immiscible fluid is selected from the group consisting of alkanes, alkenes, alkynes, and mixtures thereof that have a freezing temperature that is at least as low as −40° C. and that are not misicible with water. Suitable alkanes include Heptane ($C_7H_{16}$, melting point −91° C.), Octane ($C_8H_{18}$, melting point −57° C.), Nonane ($C_9H_{20}$, melting point −54° C.), and Decane ($C_{10}H_{22}$, melting point −30° C.). Suitable alkenes included Cyclohexene ($C_6H_{10}$, melting point −103° C.), Heptene ($C_7H_{14}$, melting point −119° C.), Cycloheptene ($C_7H_{12}$, melting point −56° C.), Octene ($C_8H_{12}$, melting point −102° C.), Cylooctene (cis) ($C_8H_{14}$, melting point −12° C.), and Cylooctene (trans) ($C_8H_{14}$, melting point −59° C.). Suitable Alkynes include 2-Octyne ($C_8H_{14}$, melting point −62° C.), and 1-Decene ($C_{10}H_{18}$, melting point −36° C.). Many other alkanes, alkenes, alkynes having six or more carbon atoms, or mixtures thereof that have a freezing temperature that is at least as low as −40° C. and that are not misicible with water will also make a suitable water immiscible fluid, such as for example those having multiple double and/or triple bonds. All such alkanes, alkenes, and alkynes and mixtures thereof are available from large chemical suppliers, such as the Aldrich Company, of Milwaukee, Wis., U.S.A.

While the present invention has been described and illustrated with respect to a particular construction of a freeze tolerant fuel cell power plant 10, it is to be understood that the invention is not to be limited to the described and illustrated embodiments. For example, the water displacement system 76 is described to include the water immiscible fluid re-cycle line 110 and re-cycle valve 136 to cycle heated water immiscible fluid through the open tubes 120A–120L of the accumulator 78 to thaw frozen water coolant within the accumulator 78. However, it is within the scope of the invention to utilize a more direct heating means for thawing frozen water within the accumulator 78, such as an electrical resistance heater or alternative heater means positioned within the accumulator 78 so that the re-cycling of heated water immiscible fluid is not required. Additionally, the freeze tolerant fuel cell power plant 10 is described above as applying to a fuel cell 12 including a proton exchange membrane ("PEM") electrolyte 14. However, the water displacement system 76 may be applied to a fuel cell having alternative electrolytes. Accordingly, reference should be made primarily to the following claims rather than the foregoing description to determine the scope of the invention.

What is claimed is:

1. A freeze tolerant fuel cell power plant for producing electrical current from reducing fluid and process oxidant reactant streams, the power plant comprising:

a. at least one fuel cell;

b. a coolant loop having a water transport plate secured within the fuel cell that directs a water coolant through the fuel cell, and a coolant circulating means secured to a coolant passage for circulating the water coolant through the coolant loop; and, c. a water displacement system including;

i. a freeze tolerant accumulator means for storing the water coolant and a water immiscible fluid;

ii. a water immiscible fluid feed line secured between the accumulator means and the coolant loop;

iii. a water immiscible fluid circulating means secured in fluid communication with the water immiscible fluid feed line for circulating the water immiscible fluid from the accumulator means;

iv. a coolant loop drain line secured between the coolant loop and a water coolant drain inlet of the accumulator; and, v. fluid displacement control valve means for selectively directing the water immiscible fluid to flow from the accumulator means into the coolant loop, and for selectively directing the water coolant within the coolant loop to flow into the accumulator means.

2. The freeze tolerant fuel cell power plant of claim 1, wherein the water immiscible fluid is selected from the group consisting of perfluorocarbons, hydrofluoroethers and mixtures thereof.

3. The freeze tolerant fuel cell power plant of claim 1, wherein the water immiscible fluid is selected from the group consisting of alkanes, alkenes, alkynes having six or more carbon atoms and mixtures thereof.

4. The freeze tolerant fuel cell power plant of claim 1, wherein the water immiscible fluid is selected from the group consisting of perfluorocarbons, hydrofluoroethers and mixtures thereof that have a freezing temperature equal to or less than minus forty degrees Celsius and that are not miscible with water.

5. The freeze tolerant fuel cell power plant of claim 1, wherein the water immiscible fluid is selected from the group consisting of alkanes, alkenes, alkynes having six or more carbon atoms and mixtures thereof that have a freezing temperature equal to or less than minus forty degrees Celsius and that are not miscible with water.

6. The freeze tolerant fuel cell power plant of claim 1, wherein the coolant loop includes a gas separator secured to the coolant passage for separating gases from the water coolant.

7. The freeze tolerant fuel cell power plant of claim 6, further comprising a water coolant overflow line secured between the gas separator and an overflow inlet of the accumulator means for directing flow of water coolant between the accumulator means and the coolant loop.

8. The freeze tolerant fuel cell power plant of claim 1, wherein the fluid displacement control valve means includes a coolant circulation valve secured on the coolant passage between the coolant circulation means and the water transport plate; a coolant feed valve secured on the coolant loop drain line between water coolant within the accumulator and the water transport plate; and, a water immiscible fluid feed valve secured on the water immiscible fluid feed line between the water immiscible fluid within the accumulator and the water transport plate.

9. The freeze tolerant fuel cell power plant of claim 1, wherein the freeze tolerant accumulator means comprises an open tube accumulator having a plurality of plastically deformable open tubes.

10. The freeze tolerant fuel cell power plant of claim 1, wherein the water displacement system further comprises a water immiscible fluid heater means for heating the water immiscible fluid secured in heat exchange relationship with the water immiscible fluid adjacent a water immiscible fluid discharge of the accumulator means, and fluid displacement valve means for selectively directing heated water immiscible fluid to flow from the accumulator means into the coolant loop and back into the accumulator means.

11. A method of operating and storing a freeze tolerant fuel cell power plant in sub-freezing ambient conditions wherein the power plant includes a fuel cell and a coolant loop having a water transport plate secured within the fuel cell that directs a water coolant through the fuel cell, and coolant circulating means secured to a coolant passage for circulating the water coolant through the coolant loop, comprising the steps of:

a. providing a freeze tolerant accumulator means for storing the water coolant and a water immiscible fluid, a water immiscible fluid feed line secured between the accumulator means and the coolant loop, a water immiscible fluid circulating means for circulating the water immiscible fluid from the accumulator means to the coolant loop, and a coolant loop drain line secured between the coolant loop and the accumulator means for draining the water coolant from the coolant loop into the accumulator means;

b. circulating the water immiscible fluid from the accumulator means to the coolant loop to displace the water coolant from the coolant loop and draining the water coolant from the coolant loop into the accumulator means through the coolant loop drain line; and, c. draining the water immiscible fluid from the coolant loop back into the accumulator means.

12. The method of claim 11, including the additional steps of providing a heater for heating the water immiscible fluid within the accumulator means, then heating and circulating the heated water immiscible fluid from the accumulator means through the coolant loop and the accumulator means and draining the heated water immiscible fluid back into the accumulator means whenever a sensed temperature of the fuel cell, coolant loop or accumulator means descends to a pre-determined minimum temperature, in order to place the fuel cell power plant in a freeze tolerant storage condition.

13. The method of claim 11, including the additional steps of providing a heater for heating the water immiscible fluid and water coolant within the accumulator means, heating the water immiscible fluid and water coolant within the accumulator means to melt any frozen water coolant; circulating the heated water immiscible fluid through the coolant loop to melt any frozen water within the coolant loop; draining the heated water immiscible fluid from the coolant loop back into the accumulator means; circulating the water coolant from the accumulator means into the coolant loop; and, preventing any drainage of the water coolant from the coolant loop into the accumulator means, in order to start up the power plant from a long term storage condition.

14. The method of claim 12, including the additional steps of, after the draining the heated water immiscible fluid back into the accumulator means step, circulating water coolant from the accumulator means through the coolant loop; and, preventing drainage of the water coolant from the coolant loop into the accumulator means, in order to start up the power plant from a short term storage condition.

15. A freeze tolerant fuel cell power plant for producing electrical current from reducing fluid and process oxidant reactant streams, the power plant comprising:

a. at least one fuel cell;

b. a coolant loop having a water transport plate secured within the fuel cell that directs a water coolant through the fuel cell, and a coolant circulating means secured to a coolant passage for circulating the water coolant through the coolant loop; and, c. a water displacement system including;

i. an open tube accumulator that contains a water immiscible fluid and coolant water;

ii. a water immiscible fluid feed line secured between a water immiscible fluid discharge of the accumulator and the coolant loop that directs the water immiscible fluid from the accumulator into the coolant loop;

iii. a water immiscible fluid re-cycle line secured between the water immiscible fluid feed line and the accumulator that directs the water immiscible fluid from adjacent the water immiscible fluid discharge of the accumulator to a water immiscible fluid inlet of the accumulator in fluid communication with open tubes of the accumulator;

iv. a heater means for heating the water immiscible fluid secured in heat exchange relationship with the water immiscible fluid adjacent the water immiscible fluid discharge of the accumulator;

v. a water immiscible fluid circulating means secured in fluid communication with the water immiscible fluid feed line for circulating the water immiscible fluid from the accumulator;

vi. a coolant loop drain line secured between the coolant loop and a water coolant drain inlet of the accumulator; and, vii. fluid displacement control valve means for selectively directing the water immiscible fluid to flow from the accumulator into the coolant loop, for selectively directing the water coolant within the coolant loop to flow into the accumulator, for selectively directing heated water immiscible fluid to flow from the accumulator into the coolant loop and back into the accumulator, and for selectively directing heated water immiscible fluid to flow from adjacent the discharge of the accumulator through the water immiscible fluid re-cycle line and through the open tubes of the accumulator.

16. The freeze tolerant fuel cell power plant of claim 15, wherein the water immiscible fluid is selected from the group consisting of perfluorocarbons, hydrofluoroethers and mixtures thereof.

17. The freeze tolerant fuel cell power plant of claim 15, wherein the water immiscible fluid is selected from the group consisting of alkanes, alkenes, alkynes having six or more carbon atoms and mixtures thereof.

18. The freeze tolerant fuel cell power plant of claim 15, wherein the fluid displacement control valve means includes a coolant circulation valve secured on the coolant passage between the coolant circulation means and the water transport plate; a coolant feed valve secured on the coolant loop drain line between water coolant within the accumulator and the water transport plate; a water immiscible fluid feed valve secured on the water immiscible fluid feed line between the water immiscible fluid within the accumulator and the water transport plate; and, a water immiscible fluid re-cycle valve secured on the water immiscible re-cycle line between the water immiscible discharge and water immiscible inlet of the accumulator.

* * * * *